Sept. 8, 1959 F. J. ALTMAN 2,903,576

DIVERSITY RECEIVING COMBINING SYSTEM

Filed Sept. 29, 1955

INVENTOR
FREDERICK J. ALTMAN
BY Ernest Fanwick
ATTORNEY 2,903,576

DIVERSITY RECEIVING COMBINING SYSTEM

Frederick J. Altman, Ridgewood, N.J., assignor to International Telephone and Telegraph Corporation, Nutley, N.J., a corporation of Maryland Application September 29, 1955, Serial No. 537,415

4 Claims. (Cl. 250—20)

Figure 1:
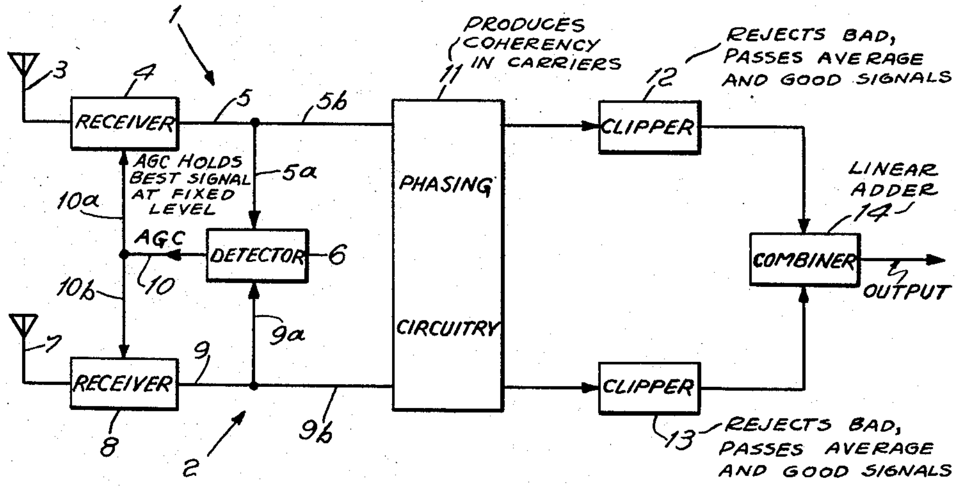

This invention relates to diversity receiving combining systems and, more particularly, to a diversity receiving combining system in which the signals are combined in accordance with a simulated optimum diversity combining law.

Diversity reception of radio signals is a well-known method of reception applied with success to short-wave transmissions in order to minimize the fading effects. It has long been felt that proper operation of a diversity receiving system requires a mode of operation for the combining of the signals which would produce the best signal-to-noise ratio possible. Prior art systems have attempted to improve the output signal-to-noise ratio by selecting one of the signals present in the receiving channels of the diversity system in order to eliminate the weaker of the two diversity signals and accept only the stronger signal. Such a mode of operation produced a signal-to-noise ratio equal only to the best diversity signal. Another method of combining the receiving signals in each channel, which has been described in the prior art, is a system which linearly adds the signals in each channel to produce a combined output. Such a system may or may not be better than the selector method of operation, depending upon the relative signal-to-noise ratios in each channel.

Recently, there has appeared an article in the "Proceedings of the Institute of Radio Engineers" for November 1954, volume 42, page 1704, by Mr. Leonard R. Kahn, in which is described a diversity combining system called the ratio-squarer system in which the optimum diversity combining law is utilized so that at all times the combined signal-to-noise ratio is greater than or at least equal to the best of the individual diversity channel signal-to-noise ratios.

One of the objects of this invention, therefore, is to provide a diversity reception system in which the signals in each channel are combined in accordance with a simulated optimum diversity combining law.

Another object of this invention is to provide a diversity reception system in which the signals are combined to produce optimum signal reception with a maximum of equipment simplicity.

A further object of this invention is to provide a diversity reception system functioning in accordance with a diversity combining law which combines the advantages of the previously known combining laws to produce a simple diversity reception system operating substantially in accordance with an optimum combining law.

One of the features of this invention is the provision of a diversity reception system having a first and second channel each producing a signal voltage. An automatic gain control signal responsive to the voltage in the channel having a greater amplitude is coupled back to the receivers in each channel in order to raise one of the receiver output signal voltages to a maximum level where it is utilized as a standard voltage amplitude. The outputs of the two receivers are then each passed through a clipper circuit which gates out the smaller signal voltage when it is less than a predetermined level below the standard signal voltage. If the lesser of the two signal voltages has an amplitude greater than the predetermined value, the outputs of each of the clipper circuits are linearly added to produce the output of the diversity reception system.

Figure 2:
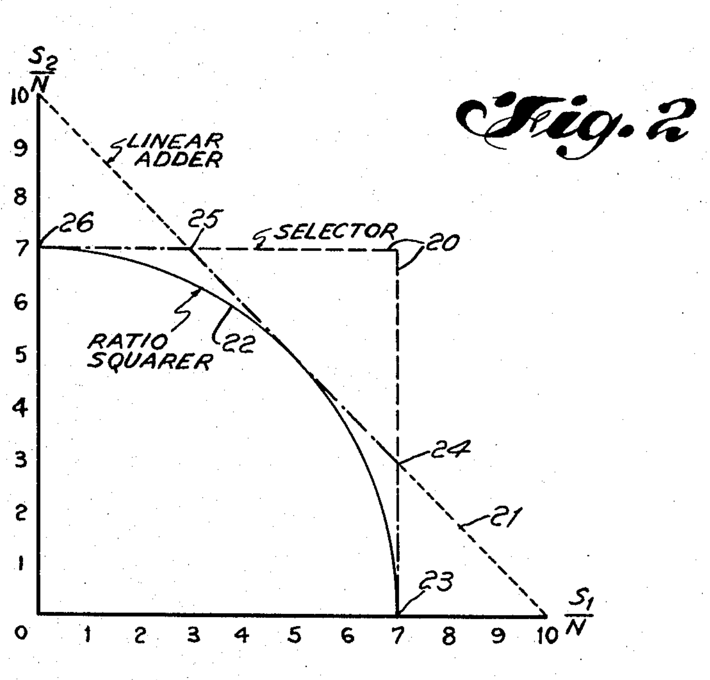

The above-mentioned and other features and objects of this invention will become more apparent by reference to the following description taken in conjunction with the accompanying drawing, in which:

Fig. 1 is a schematic drawing in block form of one embodiment of the diversity receiving combining system in accordance with the principles of my invention; and Fig. 2 shows the loci of input signal-to-noise combinations for an average output signal-to-noise ratio of seven in accordance with various diversity reception combining laws.

Referring to Fig. 1 of the drawing, a schematic diagram in block form of a simplified embodiment of the diversity receiving combining system in accordance with the principles of my invention is shown to comprise a first and second receiving channel generally indicated by numerals 1 and 2. Referring to channel 1, the signal transmissions are picked up by an antenna 3 and coupled to a receiver 4. The output of the receiver 4, which may be at the intermediate frequency (IF), is coupled over lines 5 and 5*a* to a detector 6. The signal transmissions are also detected by antenna 7 in receiving channel 2 and coupled to the receiver 8 whose output is coupled over lines 9 and 9*a* to the detector 6. The detector 6 may comprise back-to-back rectifiers connected to a common load in such a manner that the rectifier fed by the stronger signal will conduct and bias the other rectifier off. Other common types of AGC (automatic gain control) detectors for diversity receiving systems may be utilized to develop an AGC voltage responsive to the signal having the greater amplitude connected to the detector. This AGC voltage from the detector 6 is coupled over lines 10, 10*a* and 10*b* to the receivers 4 and 8 where the receiver detecting the stronger signal is controlled by the control voltage to produce a maximum signal voltage of predetermined amplitude in its output. Obviously, the output of the other receiver is increased in response to the AGC voltage but not to a maximum voltage. The outputs of each of the receivers 4 and 8 are coupled over lines 5*b* and 9*b* to the phasing circuitry 11. One embodiment of phasing circuitry 11 suitable for use in the diversity combining system of this invention is disclosed in copending application, Serial No. 535,874, filed September 22, 1955, titled "Radio Diversity Receiving System," by Frederick J. Altman and Alex T. Brown, III, and assigned to the same assignee as this invention, now abandoned. The phasing circuitry insures that the output of receivers 4 and 8 are in phase so that they may be added. The output of each channel, after being properly phased, is coupled through clipper circuits 12 and 13. The clipper circuits 12 and 13 are adjusted in such a manner as to reject any signal below a predetermined amplitude relative to the maximum signal voltage. If the signal has an amplitude which is greater than the predetermined value, clipper circuits 12 and 13 pass the signal in each channel to a combiner circuit 14 whose output may be coupled to the usual type of subceiver or detector equipment. It will, of course, appear obvious to those skilled in the art that the signals may be detected and then phased rather than being phased at the intermediate or radio frequencies. This is merely a matter of choice. The use of clipper circuits 12 and 13, of course, assumes that the signal output of receivers 4 and 8 are angle modulated, for example, frequency or phase modulation.

Referring to Fig. 2 of this invention, the graph therein shown illustrates the loci of input signal-to-noise combinations for an average output signal-to-noise ratio of seven in accordance with various diversity receiving combining laws. The first type of diversity combining system known to the prior art may be termed the selector system in which the system determines which of the channels has the stronger signal and passes that signal to the output and rejects the weaker of the two signals. This mode of operation obviously produces a signal-to-noise ratio which can be no better than the signal-to-noise ratio in one of the channels. Thus, referring to dashed curve 20 in Fig. 2, it is apparent that, if the input signal-to-noise ratio $S_1/N$ in channel 1 is 7 db and the signal-to-noise ratio $S_2/N$ in channel 2 is anything less than 7 db, the output signal will be the signal present in channel 1, and of course, the opposite holds true if the stronger signal is present in channel 2. Thus, the output of the selector method of combining diversity signals is either $S_1/N$ or $S_2/N$, where $S_1$ and $S_2$ are the signals present in the first and second channels of the diversity system, respectively.

It has been apparent for some time that it may not be desirable to completely discard the weaker of the diversity signals; and thus, the common AGC or linear adder method of combining diversity signals was devised. The method of addition is illustrated by the dotted straight line 21 in Fig. 2. In this linear adder system of combining signals, the signal-to-noise powers and signal voltages are added linearly. Thus, if the signal in channel 2 ($S_2$) should be zero, the signal in channel 1 ($S_1$) must be 3 db better or must have a signal-to-noise ratio $S_1/N$ equal to 10 in order to produce an output signal having an average signal-to-noise ratio equal to the signal-to-noise ratio represented by curve 20. However, it is apparent that, so long as the signal in the weaker channel does not go below 7 db, the linear adder method of diversity reception combining gives an output voltage which is better than the selector method of combining signals, and this is diagrammatically illustrated by the portion of curve 21 between the two lines forming curve 20. The output of the linear adder method can be shown to be $$S_1+S_2/N\sqrt{2}$$

assuming that the signals from the diversity channels add linearly while the noises add in a root-mean-square fashion and a two-channel diversity system is utilized with the noise in one channel being of a random nature and substantially equal to the noise in the other channel.

In the publication previously alluded to above, it is shown that the optimum diversity combining law entitled the "Ratio-Squarer Method" yields the solid line curve 22 which is a quarter circle having a radius equal to a 7 db output signal-to-noise ratio and which at all points produces an output or combined signal-to-noise ratio which is greater than the best of the individual channel signal-to-noise ratios and which, in all instances, is better than either the selector or linear addition method of combining signals shown by curves 20 and 21. The output signal-to-noise voltage is determined by the equation $$\sqrt{\frac{S_1^2+S_2^2}{N}}$$

which is, of course, seen to be the equation for a circle.

Although it is recognized that the ratio-squarer method produces the optimum combination of signals, it must be realized that additional equipment is necessary in order to combine the signals in each channel in accordance with the ratio-squarer law. This invention simulates the combination of signals in the diversity channel system in accordance with the ratio-squarer law while still maintaining equipment simplicity substantially equal to that of the linear adder and selector combining systems.

Thus, referring again to Fig. 2, the output voltage signal-to-noise ratio curve of this invention is represented by the dash-dot portion of curves 20 and 21. The output curve of this invention follows curve 20 from point 23 to point 24, which is the same as following the selector system of combining signals, and then proceeds along curve 21 from point 24 to point 25, following the linear adder combining law, and then once again along the selector curve 20 to point 26. The resultant output curve of this invention closely approximates the ratio-squarer combining law curve 23 and, in fact, has been computed to be substantially within 0.25 db of the optimum curve 23, on the average. Referring again to Fig. 2, it is seen that between point 23 and point 24, if the input signal-to-noise ratio in the second channel is less than the value indicated by point 24, it must be rejected; but when it exceeds the value shown by point 24, it is then linearly added to the signal in the first channel until the amplitude of the signal-to-noise ratio in the first channel falls below the point illustrated by point 25, at which time the signal in the first channel must be rejected and that in the second channel passed.

Referring again to Fig. 1, it is seen that the signals passed by the receivers 4 and 8 generate in the detector 6 an AGC voltage to maintain the output of the receiver detecting the stronger signals constant. This, of course, will be recognized as being identical with the conventional common AGC diversity system or the linear adder method of diversity selection. Thus, if nothing more happens to the signal, the outputs of receivers 4 and 8 are linearly added by combiner 14. However, the signals, before combining, are first passed through clipper circuits 12 and 13 which are so adjusted as to reject any signal below a predetermined value of the maximum signal voltage. Thus, if the signal passed to clipper 12 is the maximum signal, clipper 13 rejects any signal in the second signal channel which has an amplitude less than .414 of the signal maximum; and the reverse is also true, wherein clipper 12 rejects any signal below the predetermined value .414 if the signal in channel 2 is the greater or maximum signal after adjustment in response to the control voltage output of the detector.

While I have described above the principles of my invention in connection with specific apparatus, it is to be clearly understood that this description is made only by way of example and not as a limitation to the scope of my invention as set forth in the objects thereof and in the accompanying claims.

I claim:

1. A signal combining system comprising a first source of signals, a second source of signals, means responsive to the output of the signal source having the greater amplitude to produce a control voltage, means coupling said control voltage to adjust the gain of said first and second sources to produce a predetermined maximum output from at least one of said signal sources, a first and second threshold device each coupled to the output of one of said signal sources, each of said threshold devices having a threshold level set at a given fraction of said maximum output below which the signal output of said signal sources will not pass and above which the signal output of said signal sources will pass and a combining circuit coupled to the output of said threshold devices to combine the signal outputs therefrom when the signals of said sources are above said threshold level.

2. A signal combining system comprising a first source of signals, a second source of signals, means responsive to the output of the signal source having the greater amplitude to produce a control voltage, means coupling said control voltage to said first and second signal sources to adjust the output of one of said signal sources to a predetermined maximum amplitude, a threshold device having a threshold level set equal to a given fraction of said maximum amplitude coupled to the output of the other of said signal source to block the passage of the output signal of said other of said signal sources when the output signal thereof is below said threshold level and to pass the output signal of said other of said signal sources when the output signal thereof is above said threshold level and a combining circuit coupled to the output of said one of said signal sources and the output of said threshold device to combine the adjusted signal of said one of said signal sources and the output signal of said threshold device.

3. A diversity receiving combining system for use in a diversity reception system having a first and second receiving channel comprising first receiving means associated with said first channel for detecting a first signal voltage and second receiving means associated with said second channel to detect a second signal voltage, means responsive to the larger of said first and second signal voltages to produce a control voltage, means to couple said control voltage to said first and second receiving means to raise the output of one of said receiving means to a predetermined maximum amplitude, and means to combine the output signals of each of said first and second receiving means to produce a system output including means to block the output signal of that one of said receiving means from the system output where the amplitude thereof falls below a set predetermined fraction of said maximum amplitude.

4. A system to combine signal-to-noise ratio outputs of a plurality of signal sources comprising a first and second source of signals, means responsive to the larger signal of said first and second source of signals to produce a control voltage, means coupling said control voltage to said first and second source of signals to adjust the output of one of said sources to a predetermined maximum signal voltage level, combining means including a threshold device having a threshold level equal to a given fraction of said maximum signal voltage level set coupled to the output of said sources of signals to linearly add the signal voltage outputs of said first and second sources of signals when the signal voltage having the lowest relative value is greater than said threshold level and to reject the signal voltage having the lowest relative value when this value is less than said threshold level.

References Cited in the file of this patent

UNITED STATES PATENTS

| | | |
|---|---|---|
| 1,747,220 | Bown | Feb. 18, 1930 |
| 2,505,266 | Villem | Apr. 25, 1950 |
| 2,570,431 | Crosby | Oct. 9, 1951 |

FOREIGN PATENTS

| | | |
|---|---|---|
| 125,987 | Australia | Nov. 20, 1947 |
| 727,279 | Germany | Oct. 30, 1942 |